United States Patent
Galstian

(10) Patent No.: US 11,097,651 B2
(45) Date of Patent: Aug. 24, 2021

(54) VEHICLE HEADLIGHT BEAM CONTROL HAVING A LIQUID CRYSTAL DRIVING CIRCUIT AND LIQUID CRYSTAL BROADENING DEVICE

(71) Applicant: LensVector Inc., San Jose, CA (US)

(72) Inventor: Tigran Galstian, Quebec (CA)

(73) Assignee: LENSVECTOR INC., San Jose, CA (US)

( * ) Notice: Subject to any disclaimer, the term of this patent is extended or adjusted under 35 U.S.C. 154(b) by 185 days.

(21) Appl. No.: 16/487,888

(22) PCT Filed: Feb. 26, 2018

(86) PCT No.: PCT/CA2018/050213
§ 371 (c)(1),
(2) Date: Aug. 22, 2019

(87) PCT Pub. No.: WO2018/152644
PCT Pub. Date: Aug. 30, 2018

(65) Prior Publication Data
US 2020/0231084 A1    Jul. 23, 2020

Related U.S. Application Data

(60) Provisional application No. 62/463,317, filed on Feb. 24, 2017.

(51) Int. Cl.
*B60Q 1/12* (2006.01)
*F21S 41/64* (2018.01)
(Continued)

(52) U.S. Cl.
CPC ............... *B60Q 1/12* (2013.01); *B60Q 1/143* (2013.01); *F21S 41/645* (2018.01); *G02F 1/29* (2013.01);
(Continued)

(58) Field of Classification Search
CPC .......... B60Q 1/12; B60Q 1/143; F21S 41/645
See application file for complete search history.

(56) References Cited

U.S. PATENT DOCUMENTS

| 7,118,237 B2 | 10/2006 | Nishimura |
| 2003/0137849 A1 | 7/2003 | Alden |

(Continued)

FOREIGN PATENT DOCUMENTS

| CN | 105564296 A | 5/2016 |
| CN | 105822975 A | 8/2016 |

(Continued)

OTHER PUBLICATIONS

Supplementary European search report and search opinion dated Nov. 26, 2020 for European application No. EP18757081.7.

(Continued)

*Primary Examiner* — Robert J May
(74) *Attorney, Agent, or Firm* — J-Tek Law PLLC; Jeffrey D. Tekanic; Scott T. Wakeman

(57) ABSTRACT

For vehicles having left and right headlights, a steering direction signal input indicative of a left or right steering direction is used to modulate a control signal of a liquid crystal beam broadening device to broaden horizontally the vehicle headlight beam when the steering direction signal input is indicative of a selected one of a left or a right steering direction and to maintain or reduce a horizontal spread of the vehicle headlight beam when said steering direction signal input is indicative of one of a left or a right steering direction opposite to the selected steering direction.

13 Claims, 4 Drawing Sheets

(51) Int. Cl.
  *B60Q 1/14*  (2006.01)
  *G02F 1/29*  (2006.01)
  *F21W 102/19*  (2018.01)

(52) U.S. Cl.
  CPC ... *B60Q 2300/122* (2013.01); *F21W 2102/19* (2018.01)

(56)         References Cited

U.S. PATENT DOCUMENTS

2003/0202357 A1  10/2003  Strazzanti
2005/0128764 A1   6/2005  Enders
2008/0130302 A1   6/2008  Watanabe
2009/0279316 A1  11/2009  Hikmet et al.
2016/0077402 A1   3/2016  Takehara et al.

FOREIGN PATENT DOCUMENTS

DE      10034484 A1    1/2002
EP       0276187 B1   10/1991
EP       3109095 A1   12/2016
JP    2006-147377 A    6/2006
WO     2016/082031 A1  6/2016
WO     2017/041167 A1  3/2017

OTHER PUBLICATIONS

International Search Report dated May 11, 2018 for parent application No. PCT/CA2018/050213.
Written Opinion dated May 11, 2018 for parent application No. PCT/CA2018/050213.

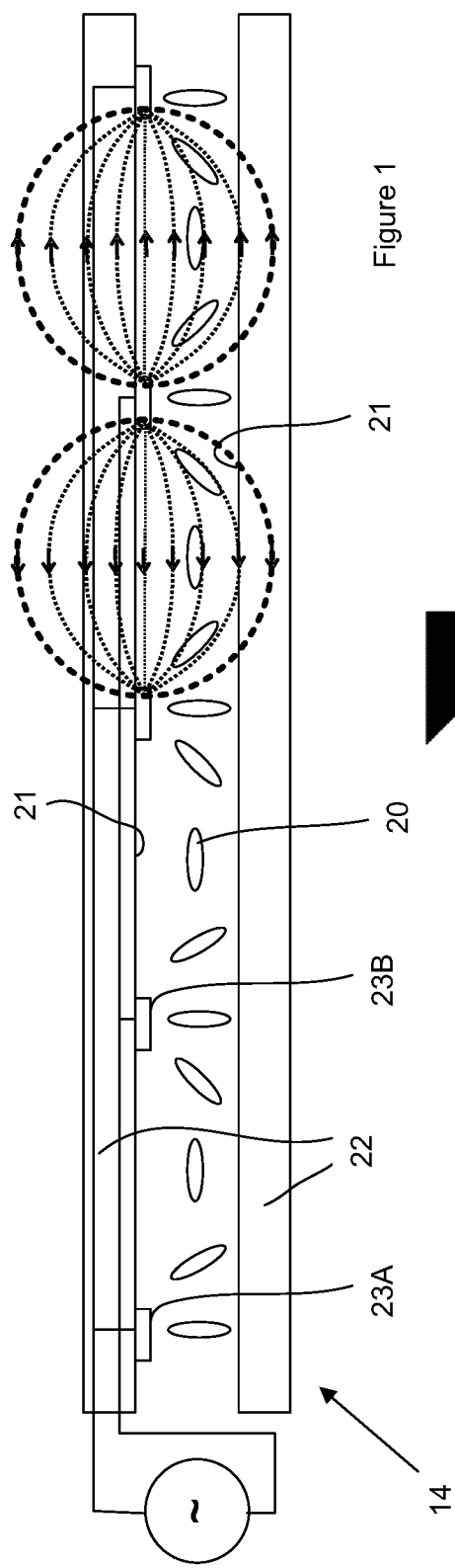
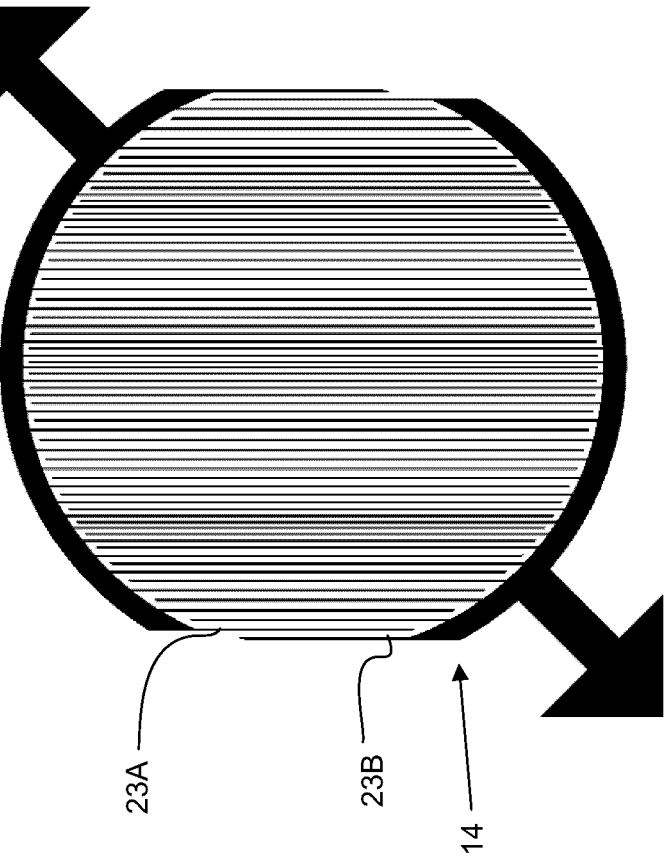
Figure 1
Figure 2

VEHICLE HEADLIGHT BEAM CONTROL HAVING A LIQUID CRYSTAL DRIVING CIRCUIT AND LIQUID CRYSTAL BROADENING DEVICE

This patent application is the U.S. National Stage of International Application No. PCT/CA2018/050213 filed on Feb. 26, 2018, which claims priority of U.S. provisional patent application 62/463,317 filed Feb. 24, 2017, the entirety of which is hereby incorporated by reference.

TECHNICAL FIELD

This patent application relates to vehicle headlight beam control devices.

BACKGROUND

Some luxury vehicles have been known to incorporate mountings for headlights that turn with the vehicle steering. An example is the 1968 DS model of the French-made Citroen having, behind each glass cover lens, an inboard high-beam headlamp that swiveled by up to 80° as the driver steers, throwing the beam along the driver's intended path rather than uselessly across a curved road.

Beam control devices that avoid moving parts for vehicle headlights or headlamps are known in the art, as for example in US PG-Pub 2009/0279316 and US PG-Pub 2003/0137849.

SUMMARY

Applicant has discovered that beam broadening control can be useful for directing vehicle headlight illumination for navigating corners. Beam control optical devices can be adjusted independently for left and right headlights. The headlight adjustment can involve broadening and optionally elevation tilt angle, azimuth tilt angle, or intensity, along with any desired combination of these.

For vehicles having left and right headlights, a steering direction signal input indicative of a left or right steering direction is used to modulate a control signal of a liquid crystal beam broadening device to broaden horizontally the vehicle headlight beam when the steering direction signal input is indicative of a selected one of a left or a right steering direction and to maintain or reduce a horizontal spread of the vehicle headlight beam when said steering direction signal input is indicative of one of a left or a right steering direction opposite to the selected steering direction.

BRIEF DESCRIPTION OF THE DRAWINGS

The invention will be better understood by way of the following detailed description of embodiments of the invention with reference to the appended drawings, in which:

FIG. 1 is a schematic sectional view of a liquid crystal beam broadening cell causing broadening in one direction;

FIG. 2 is a plan view of a liquid crystal beam broadening cell having a substantially circular aperture;

DETAILED DESCRIPTION

Figure 3:
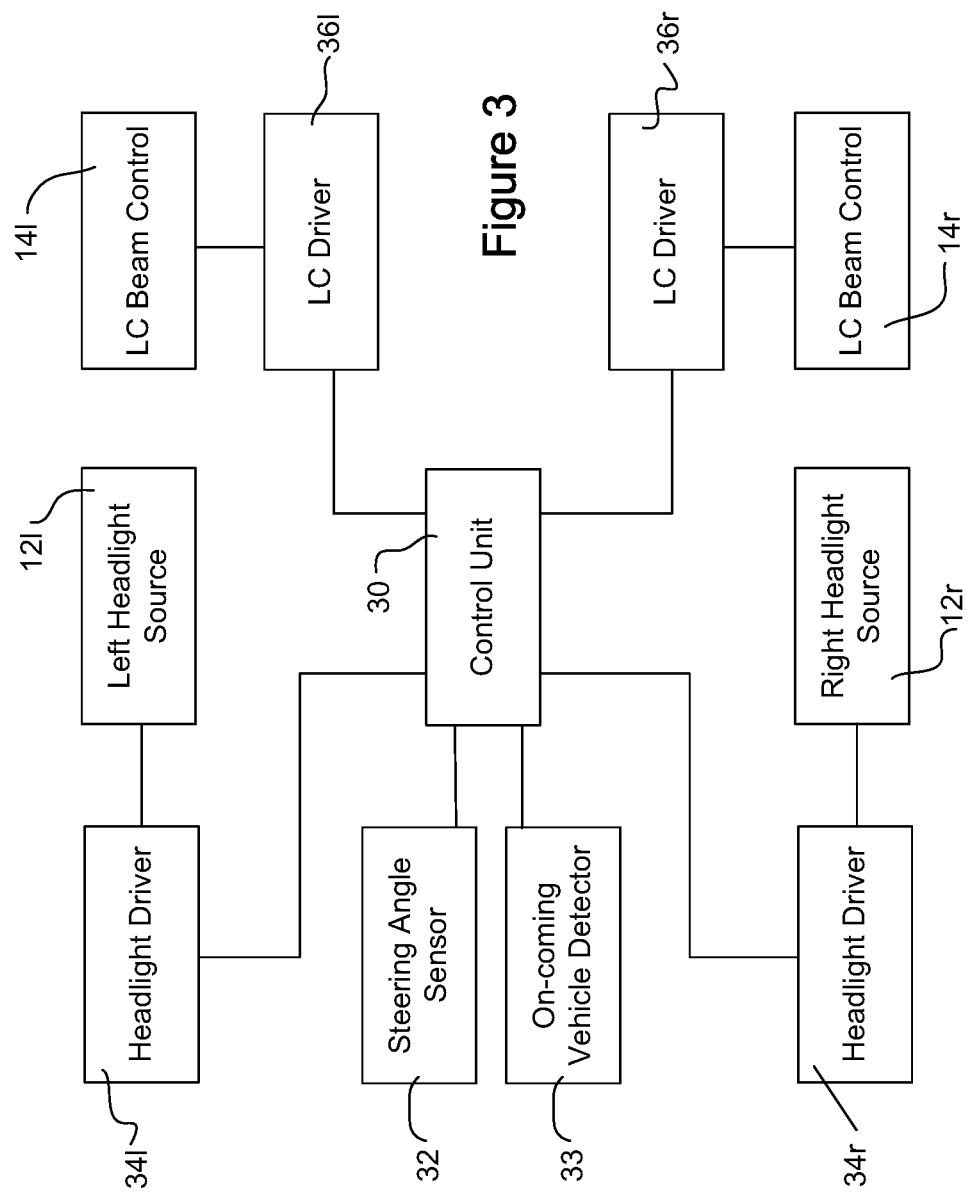
FIG. 3 is a schematic block diagram of the headlight control circuit.

Liquid crystal (LC) beam control devices are known in the art. The devices include LC beam broadening devices and LC beam steering devices. The ability of an LC beam broadening device to control a beam is typically greater than for an LC beam steering device. A typical LC beam steering devices are able to direct a beam from 0 degrees to about 10 degrees, while a typical LC beam broadening device can add from 0 to about +/−30 degrees. Steering by a few degrees can be useful for headlight altitude adjustment, however, for changing the azimuth of the beam for corner handling, it is typically ineffective.

As illustrated in FIG. 1, an LC device is schematically illustrated in cross-section, while FIG. 2 illustrates an LC device having a circular aperture.

While a beam broadening LC device 14 can take a variety of forms, the device illustrated in FIG. 1 broadens light in one direction only, and is to be arranged to broaden a beam essentially in the horizontal direction. The device 14 has cell wall substrates 22, typically made of glass, with strip electrodes 23 placed on one of the substrates. This is known as "in-plane" switching or control.

The LC material 20 can be nematic LC having a ground state defined by one or more alignment layers 21 (alignment of LC can be planar or homeotropic). To modulate both linear polarizations of light, the device 14 can comprise two cells of LC material 20 with the alignment layers having an orthogonal director orientation. It will be appreciated that modulation of only one polarization can allow for modulation of one half of the light. More LC layers may be used to obtain further functionalities, such as broadening in perpendicular planes independently, etc. It has been found that when such orientation is at 45 degrees with respect to the direction of strip electrodes 23 that color separation can be reduced.

The electrodes 23 can be transparent electrodes or opaque, the latter causing some loss of transmission. When in the ground state, the LC material 20 is uniform and transparent. The electric field orients the LC material whose index of refraction for one linear polarization changes as a function of the orientation of the LC material. Thus, a variable amount of beam broadening can be achieved by controlling the electrode drive signal. The gap between electrodes 23 can be from about 0.02 mm to about 0.1 mm, while the thickness of the LC material layer 20 can be about 0.03 mm to about 0.1 mm.

A similar beam broadening effect can be achieved by providing an opposed electrode arrangement instead of the in-plane arrangement illustrated in FIG. 1. For example, strip electrodes on one substrate, like the top substrate shown in FIG. 1, can be provided, while a uniform transparent electrode can be provided on the bottom substrate. Such strip electrodes can be connected together with an electric field formed between them and the opposed uniform electrode. This will create a different electric field, however with a similar final effect of creating beam broadening.

The device illustrated in FIG. 1 would typically comprise a large number of closely spaced electrodes, as illustrated in FIG. 2. The device 14 illustrated in FIG. 2 has a circular aperture. It will be appreciated that the aperture can be arranged to have a geometry that matches the headlight beam's profile. It will also be appreciated that the beam broadening device can be integrated with a beam forming reflector rather than being arranged in the output beam path, and that non-LC beam broadening devices can also be used within the context of the present application.

FIG. 3 is a block diagram of a headlight control system comprising right and left headlight sources 12r and 12l respectively, a control unit 30, and steering angle sensor 32. The control unit 30 can provide control signals to drivers 34 that can adjust an intensity of the sources 12. The control unit 30 provides control signals to drivers 36 that provide control signals to beam control devices 14.

Figure 4:
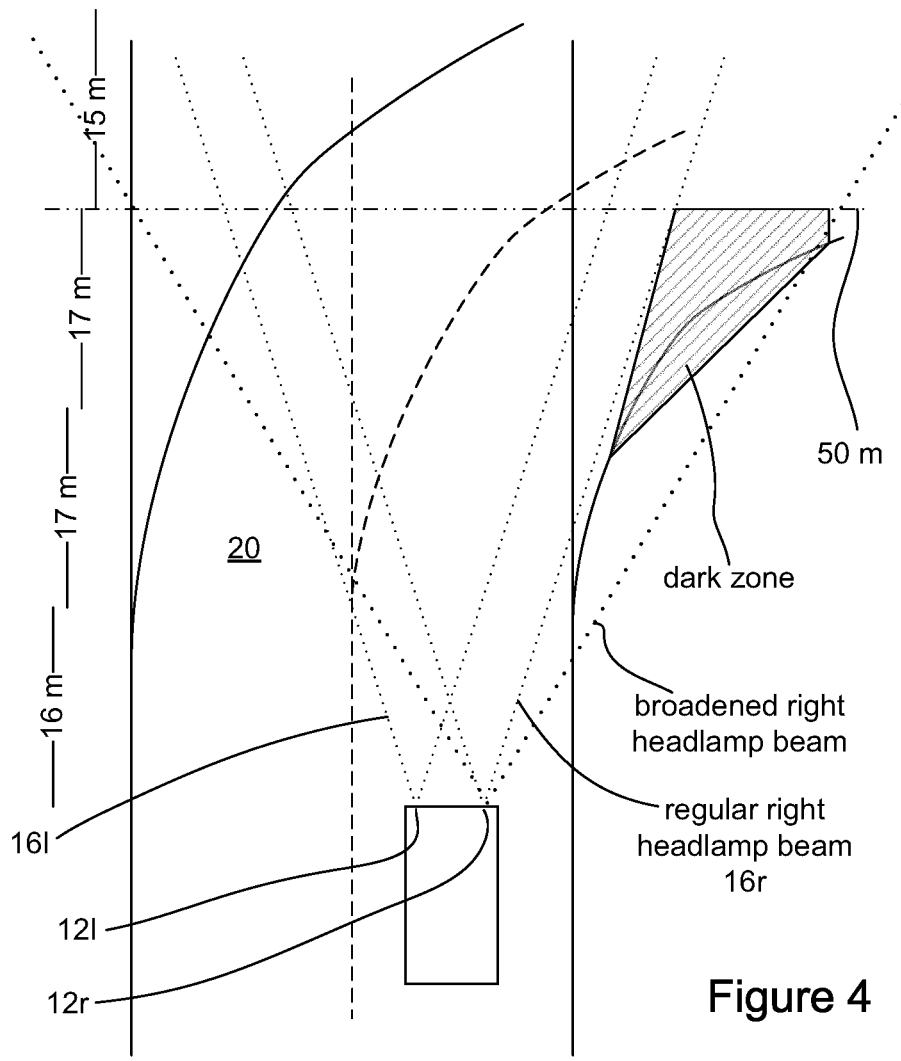
FIG. 4 is a plan schematic view of a vehicle on a road showing the beams from headlights in which the right headlight beam is broadened using a liquid crystal beam control device to send light to illuminate a dark zone at the inside of a curve that would otherwise not be illuminated.

In the diagram of FIG. 4, there is illustrated a vehicle 10 having headlights 12l and 12r projecting beams 16l and 16r onto a road surface 20 in which the vehicle drives on the right side of the road. As shown, the beams 16 have a given divergence and orientation to provide an illumination of the road surface. The headlights can have a light source and optics for projecting a narrow beam of light. The LC beam diffusing devices 14 (see FIG. 3) can be placed in the optical path of the headlight. When the LC devices 14 are controlled to be transparent, the original beam is projected, while when the LC device is controlled to provide beam divergence, the beam is broadened.

The beams 16l and 16r can be narrower than would be normally provided for a vehicle headlight, and the normal beam to illuminate the roadway can be achieved by using a first level of beam broadening from devices 14. When the steering angle sensor 32 (see FIG. 3) indicates that the vehicle is turning, then control unit 30 can adjust the control signals provided to the drivers 36, and preferably both drivers 34 and 36.

In the case of a right turn as illustrated in FIG. 4, the left beam 15l can be reduced in intensity or left to have its original intensity using its driver 34l and given no broadening using its device 14l as controlled by its driver 36l. In the case that beam 15l is a narrower than normal beam, its device 14l can be controlled to reduce or remove broadening such that beam 15l is narrower than normal. Meanwhile beam 15r can be broadened by signaling driver 36r, and it can be made brighter by signaling driver 34r. The result is improved lighting of the curve in the road on the right side. This has the effect of illuminating a portion of the road ahead that would otherwise have been outside of the illumination of the headlights.

The steering angle sensor 32 can be a sensor connected to the vehicle steering, for example, it can be a reading from the vehicle's on-board computer, or from an accelerometer. In the case of an accelerometer, the accelerometer can be integrated into a local electronic controller that provides the driver circuit 34/36 for each device 14.

Those skilled in the art will realize that the steering angle sensor 32 can comprise alternatively or additionally one or more of an incline sensor, a sensor for the speed of the vehicle, a road bend sensor, a radial force sensor, and a GPS sensor system.

Figure 5:
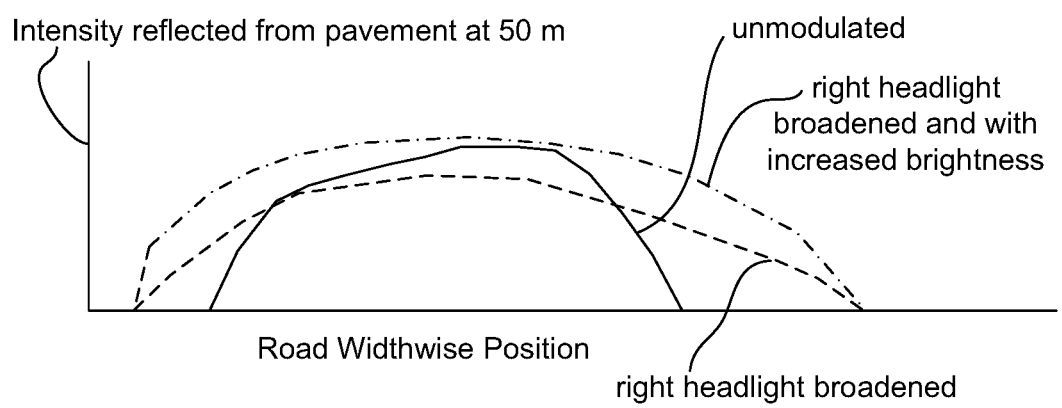
FIG. 5 illustrates a headlight intensity reflected from the pavement at 50 meters from the vehicle when no intensity adjustment is performed before broadening of the right headlight, a headlight intensity reflected from the pavement at 50 meters from the vehicle when no intensity adjustment is performed after broadening of the right headlight, and a headlight intensity reflected from the pavement at 50 meters from the vehicle when the intensity of the right headlight is increased and broadened.

The road illumination is schematically illustrated in FIG. 5. The intensity of the reflected light from the road surface at a nominal distance of 50 meters is schematically shown for three different beam control states. In a first state, the headlights 12l and 12r are directed to illuminate in a regular straight-ahead beam shape, and the beams from the two headlights 12 combine to form the intensity pattern. In the second state, the right headlight 12r has its beam broadened without any change in beam intensity. The result causes the right side of the road straight ahead to be less illuminated since the right headlight beam is broadened, while the right side of the curved road is given illumination. By increasing the brightness of headlight 12r and reducing the brightness of headlight 12l, then the illumination of the right curved road is balanced and corrected. As described above, if the first beam pattern involves a first level of broadening of a narrower headlight beam, and such broadening is removed for the outside headlight, then the beam pattern can be moved to the inside of the turn.

The use of multiple LC layer devices may enable the control of light beam in both horizontal and vertical planes. This may be used to optimize the driving or object detection depending upon the speed of the car movement.

Figure 6A:
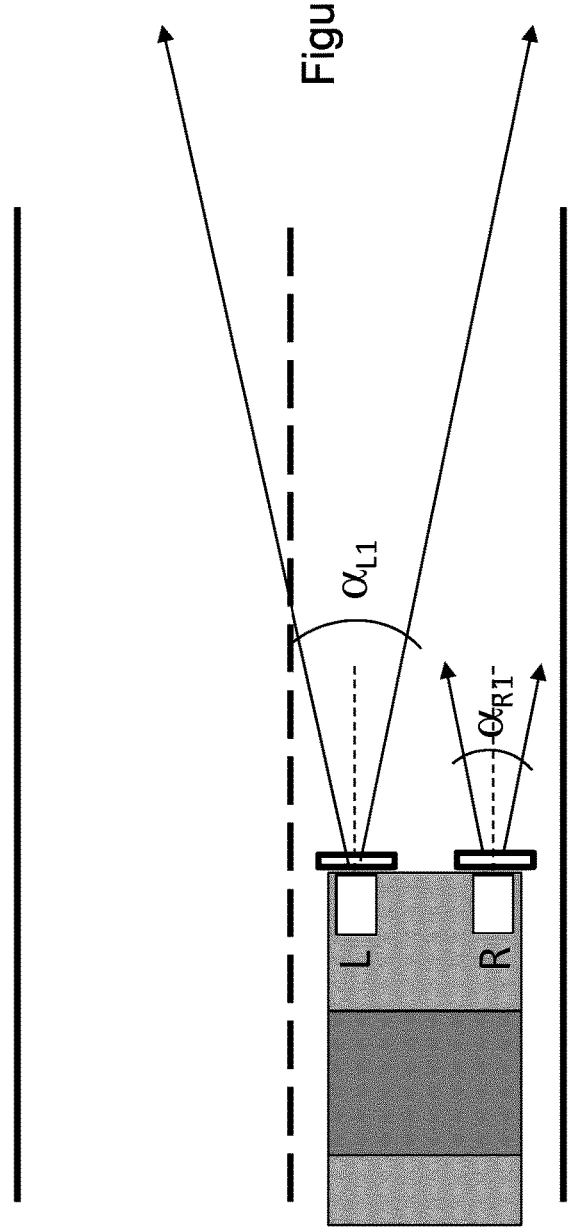
FIG. 6A illustrates the illumination suitable when no on-coming car is present, namely the headlight closest to the opposed traffic lane has a broadened width with an angle $\alpha_{L1}$.
Figure 6B:
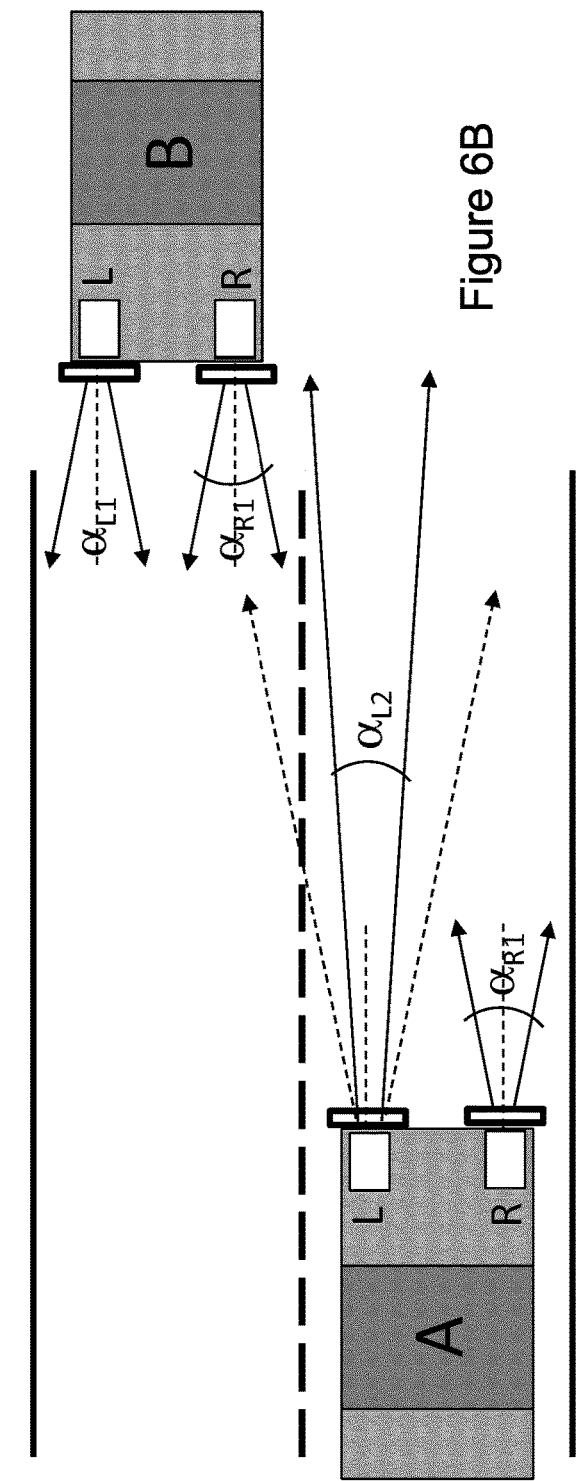
FIG. 6B illustrates the illumination suitable when an on-coming car is present, namely the headlight closest to the opposed traffic lane has a narrower width with an angle $\alpha_{L2}$.

The dynamic control of light broadening angle of the car may be used to optimize the driving conditions by avoiding blinding the driver of the car moving in the opposite direction on the same street as illustrated in FIGS. 6A and 6B. The light angle and intensity of a single car may be chosen to be in the "normal" or "single" mode ($\alpha_{L1}$) when there is no car moving in the opposite direction (FIG. 6A). Detection of the on-coming vehicle is performed by a camera or light sensor 33 whose signal is processed by the control unit 30 to broaden the headlight beam (left side and/or right) when no on-coming vehicle is detected and to reduce broadening (or not to add any broadening at all) when an on-coming vehicle is detected (see FIG. 3). However, the left headlight's broadening angle may be reduced ($\alpha_{L2}$) when the car B is detected (FIG. 6B). The intensity of that headlight may be consequently reduced too (to maintain optimal level of illumination of the street). The same should be preferably done by the car B. This will avoid car drivers of cameras (for security or assisted driving) to become blind.

What is claimed is:

1. A liquid crystal beam broadening apparatus for use with a left side or a right side vehicle headlight producing a beam, the apparatus comprising:
   a control unit;
   a liquid crystal driver circuit responsive to a control signal from said control unit; and
   a liquid crystal beam broadening device responsive to a drive signal provided from said driver circuit to broaden said vehicle headlight beam in a horizontal direction,
   wherein said control unit comprises a steering direction signal input indicative of a left or right steering direction and modulates said control signal so that said device broadens horizontally the vehicle headlight beam when said steering direction signal input is indicative of a selected one of a left or a right steering direction and maintains or reduces a horizontal spread of the vehicle headlight beam when said steering direction signal input is indicative of one of a left or a right steering direction opposite to said selected steering direction.

2. The apparatus as defined in claim 1, wherein the vehicle headlight beam is a horizontally narrow beam, and said control unit provides a control signal to cause said device to broaden vehicle headlight beam by a small amount when said steering direction signal indicates a straight road and to reduce a horizontal spread of the vehicle headlight beam when said steering direction signal input is indicative of one of a left or a right steering direction opposite to said selected steering direction.

3. The apparatus as defined in claim 2, wherein said control signal is proportional to said steering direction signal.

4. The apparatus as defined in claim 2, further comprising a vehicle headlight driver for modulating an intensity of the vehicle headlight, wherein said control unit is further responsive to said steering direction signal to increase the intensity of the vehicle headlight in said selected steering direction.

5. The apparatus as defined in claim 4, wherein said control unit is further responsive to said steering direction signal to decrease the intensity of the vehicle headlight in said opposite steering direction.

6. The apparatus as defined in claim 1, wherein said control signal is proportional to said steering direction signal.

7. The apparatus as defined in claim 6, further comprising a vehicle headlight driver for modulating an intensity of the vehicle headlight, wherein said control unit is further responsive to said steering direction signal to increase the intensity of the vehicle headlight in said selected steering direction.

8. The apparatus as defined in claim 7, wherein said control unit is further responsive to said steering direction signal to decrease the intensity of the vehicle headlight in said opposite steering direction.

9. The apparatus as defined in claim 1, further comprising a vehicle headlight driver for modulating an intensity of the vehicle headlight, wherein said control unit is further responsive to said steering direction signal to increase the intensity of the vehicle headlight in said selected steering direction.

10. The apparatus as defined in claim 9, wherein said control unit is further responsive to said steering direction signal to decrease the intensity of the vehicle headlight in said opposite steering direction.

11. A vehicle headlight system comprising:
    a left side vehicle headlight for producing a beam on a left side of a vehicle;
    a right side vehicle headlight for producing a beam on a right side of a vehicle;
    a left side liquid crystal beam broadening apparatus according to claim 1 for modulating said left side vehicle headlight beam;
    a right side liquid crystal beam broadening according to claim 1 for modulating said right side vehicle headlight beam.

12. The system as defined in claim 11 wherein said control unit of said left side liquid crystal beam broadening apparatus and said control unit of said right side liquid crystal beam broadening apparatus are combined into a common control unit.

13. A liquid crystal beam broadening apparatus for use with a vehicle headlight producing a beam, the apparatus comprising:
    a control unit;
    a liquid crystal driver circuit responsive to a control signal from said control unit; and
    a liquid crystal beam broadening device responsive to a drive signal provided from said driver circuit to broaden said vehicle headlight beam in a horizontal direction,
    wherein said control unit comprises a signal input indicative of presence or absence of an on-coming vehicle and modulates said control signal so that said device broadens horizontally the vehicle headlight beam when said signal input is indicative of absence of an on-coming vehicle and maintains or reduces a horizontal spread of the vehicle headlight beam when said signal input is indicative of presence of an on-coming vehicle.

\* \* \* \* \*